(12) United States Patent
Zhang et al.

(10) Patent No.: US 9,791,271 B2
(45) Date of Patent: Oct. 17, 2017

(54) WINDOW MODULE, A WINDOW AND LASER LINE PROJECTOR WITH THE WINDOW

(71) Applicant: Changzhou Huada Kejie Opto-Electro Instruction Co. Ltd., Jiangsu (CN)

(72) Inventors: Ou Zhang, Jiangsu (CN); Kai Fei, Jiangsu (CN)

(73) Assignee: Changzhou Huada Kejie Opto-Electro Instruction Co. Ltd, Jiangsu (CN)

( * ) Notice: Subject to any disclaimer, the term of this patent is extended or adjusted under 35 U.S.C. 154(b) by 217 days.

(21) Appl. No.: 14/732,283

(22) Filed: Jun. 5, 2015

(65) Prior Publication Data

US 2015/0268044 A1 Sep. 24, 2015

Related U.S. Application Data

(63) Continuation of application No. PCT/CN2013/001323, filed on Jan. 11, 2013.

(30) Foreign Application Priority Data

Jun. 12, 2012 (CN) .......................... 2012 1 0519298

(51) Int. Cl.
*G01C 15/00* (2006.01)
(52) U.S. Cl.
CPC ......... *G01C 15/002* (2013.01); *G01C 15/004* (2013.01)
(58) Field of Classification Search
CPC .................................................. G01C 15/002
USPC ............................................................ 33/290
See application file for complete search history.

(56) References Cited

U.S. PATENT DOCUMENTS

| | | | | |
|---|---|---|---|---|
| 5,272,814 A * | 12/1993 | Key | ...................... | G01C 15/004 33/286 |
| 5,533,268 A * | 7/1996 | Keightley | ............ | G01C 15/004 33/290 |
| 6,195,901 B1 * | 3/2001 | Falb | ...................... | G01C 15/004 33/286 |
| 6,282,028 B1 | 8/2001 | Waibel et al. | | |
| 7,127,822 B2 * | 10/2006 | Kumagai | ............. | G01C 15/002 33/290 |
| 7,196,302 B2 * | 3/2007 | Ohtomo | ............... | G01C 15/002 250/206.2 |

(Continued)

FOREIGN PATENT DOCUMENTS

CN 202471063 U 10/2012
CN 202974283 U 6/2013

(Continued)

OTHER PUBLICATIONS

Abstract of CN202974283, dated Jun. 5, 2013, 1 page.

(Continued)

*Primary Examiner* — Christopher Fulton
(74) *Attorney, Agent, or Firm* — Barley Snyder

(57) ABSTRACT

A window for a laser line projector has a front window, a left window, and a right window positioned on the same plane. A projection of the front window, left window and right window has a shape of an isosceles trapezoid. The projection of the front window is an upper base of the isosceles trapezoid. The projections of the left window and right window are opposite legs of the isosceles trapezoid.

10 Claims, 4 Drawing Sheets

(56) References Cited

U.S. PATENT DOCUMENTS

| | | | | |
|---|---|---|---|---|
| 7,454,839 B2* | 11/2008 | Della Bona | ............ | F16M 11/14 |
| | | | | 33/281 |
| 7,536,796 B2* | 5/2009 | Tamamura | ............. | G01C 15/02 |
| | | | | 33/291 |
| 7,685,723 B2* | 3/2010 | Kallabis | ................ | G01C 15/004 |
| | | | | 33/286 |
| 7,886,450 B1* | 2/2011 | Fiano | ...................... | G01C 15/02 |
| | | | | 33/286 |
| 8,402,665 B2* | 3/2013 | Litvin | .................. | G01C 15/004 |
| | | | | 33/290 |
| 9,255,796 B2* | 2/2016 | Kodaira | ................ | G01C 15/008 |
| 2007/0271800 A1 | 11/2007 | Hersey et al. | | |
| 2011/0013247 A1* | 1/2011 | Matsuoka | ............ | G02B 26/101 |
| | | | | 359/202.1 |
| 2013/0167386 A1* | 7/2013 | Peng | .................... | G01C 15/004 |
| | | | | 33/290 |
| 2015/0052763 A1 | 2/2015 | Zhang et al. | | |

FOREIGN PATENT DOCUMENTS

| | | |
|---|---|---|
| JP | 2001124556 A | 5/2001 |
| JP | 2005195936 A | 7/2005 |

OTHER PUBLICATIONS

Abstract of JP2001124556, dated May 11, 2001, 2 pages.
Abstract of CN202471063, dated Oct. 3, 2012, 1 page.
Abstract of JP2005195936, dated Jul. 21, 2005, 2 pages.

\* cited by examiner

WINDOW MODULE, A WINDOW AND LASER LINE PROJECTOR WITH THE WINDOW

CROSS-REFERENCE TO RELATED APPLICATION

This application claims priority under 35 U.S.C. §119(a)-(d) or (f) to International Patent Application No. PCT/CN2013/001323, filed Jan. 11, 2013, and to Chinese Patent Application No. 201210519298.8, filed Jun. 12, 2012.

FIELD OF THE INVENTION

The invention is generally related to a laser line projector, and, more specifically, to a laser line projector that projects laser lights outwardly through a window module.

BACKGROUND

With the development of laser line projectors, the number of applications utilizing this technology is expanding in different fields, resulting in a marked increase in user requirements.

For example, laser line projectors have been developed to emit a 360 degree laser, where the laser line covers the 360 degrees in a single plane. These conventional laser line projectors achieve a 360 degree laser by positioning a laser module every 90 degrees. The diffusion angle between cross lines emitted by each of the laser modules is between 120 degrees and 150 degrees. This means that at least four laser modules are required to create the 360 degree laser line. One of the disadvantages of such an approach is that the use of four laser modules results in the conventional laser line projectors requiring large spaces and having high manufacturing costs.

SUMMARY

The present invention provides a improved window for the laser line projector in order to overcome the above defects.

A window for a laser line projector has a front window, a left window, and a right window positioned on the same plane. A projection of the front window, left window and right window has a shape of an isosceles trapezoid. The projection of the front window is an upper base of the isosceles trapezoid. The projections of the left window and right window are opposite legs of the isosceles trapezoid.

BRIEF DESCRIPTION OF THE DRAWINGS

The invention will now be described by way of example, with reference to the accompanying Figures, of which.

DETAILED DESCRIPTION OF THE PREFERRED EMBODIMENTS

The invention will now be described through exemplary embodiments, with reference to FIGS. 1-4.

Figure 1:
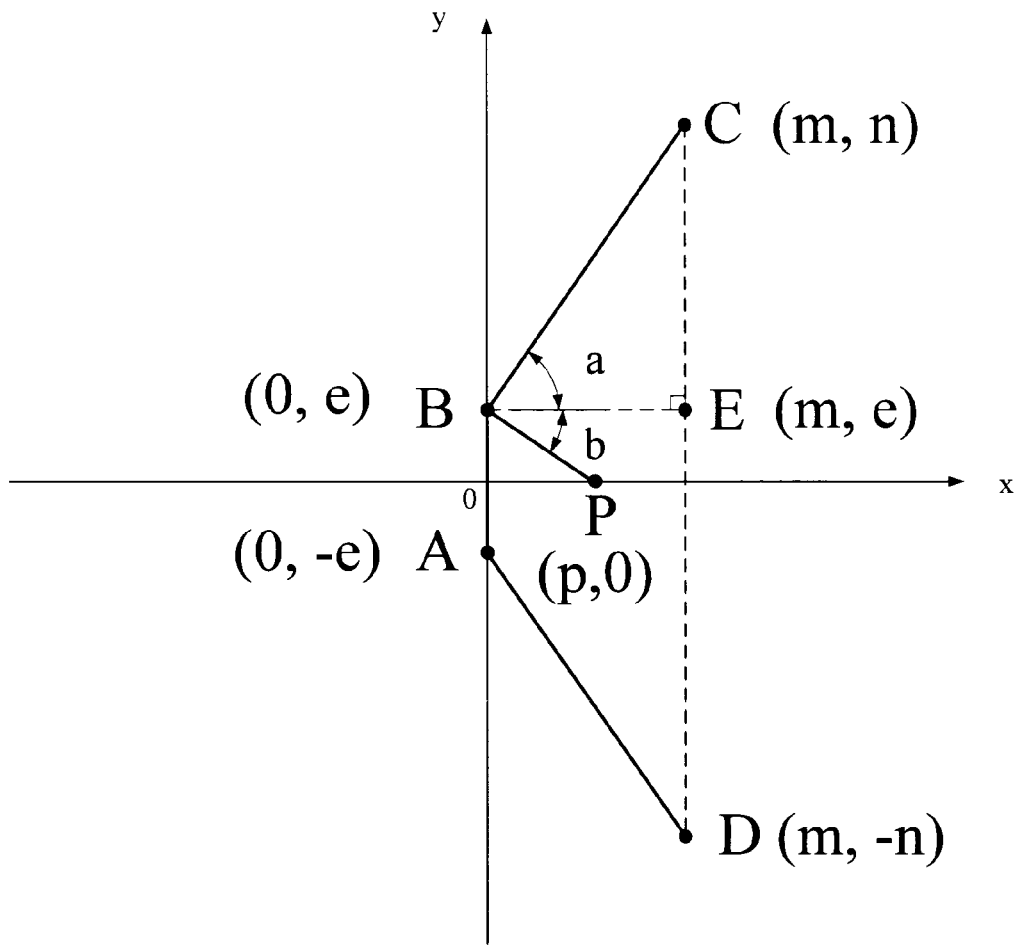
FIG. 1 shows a Cartesian diagram of a window module.

In an embodiment shown in FIG. 1, a window module has a front window, a left window, and a right window on the same plane. In order to describe the relative relationship between these three windows, the invention will be described based on the projections of the three windows on the same plane.

The projection of front window on the plane is line segment AB, the projection of left window on the plane is line segment BC, and the projection of right window on the plane is line segment AD. These three line segments create an isosceles trapezoid ABCD, wherein line segment AB is the upper base of the isosceles trapezoid, the line segments BC and AD are the legs of the isosceles trapezoid, and the line segment CD is the lower base of isosceles trapezoid (as shown on dotted line).

A Cartesian coordinate system XoY is created as follows:
the midpoint 0 of line segment AB is the origin of the Cartesian coordinate system;
the direction of line segment OB acts in the positive direction of the Y-axis;
the direction that the perpendicular bisector of line segment AB extends towards line segment CD acts in the positive direction of the X-axis.

In the Cartesian coordinate system XoY, the coordinates of C point are (m, n), the coordinates of D point are (m, −n), E point is the projection of B point on the line segment CD whose coordinates are (m, e), the coordinates of B point are (0, e), the coordinates of A point are (0, −e). P point is the light source point whose coordinates are (p, 0), wherein m, n, e, p satisfy the conditions as follows:

$$m>0, n>0, e>0, p>0, \text{and } 0<p<m.$$

The coordinate system is further defined that ∠CBE is "a" and ∠PBE is "b", which both are acute angles. In order to implement the effect of eliminating stray light, "a" and "b" satisfy the conditions as follows:

$$a>b \text{ and } a+b>90°.$$

Considering O point is stationary and P point, as the light source point, is stationary as well in the Cartesian coordinate system XoY, C point and D point can be considered as the edge of the window, which are stationary as well. This means that the position of A point and B point will affect the layout of the whole window module. In other words, the value of e will affect the value of "a" directly and eliminate any stray lights that are caused by the window module.

In order to obtain the value range of "a", two critical points can be archived according to above description.

Figure 2A:
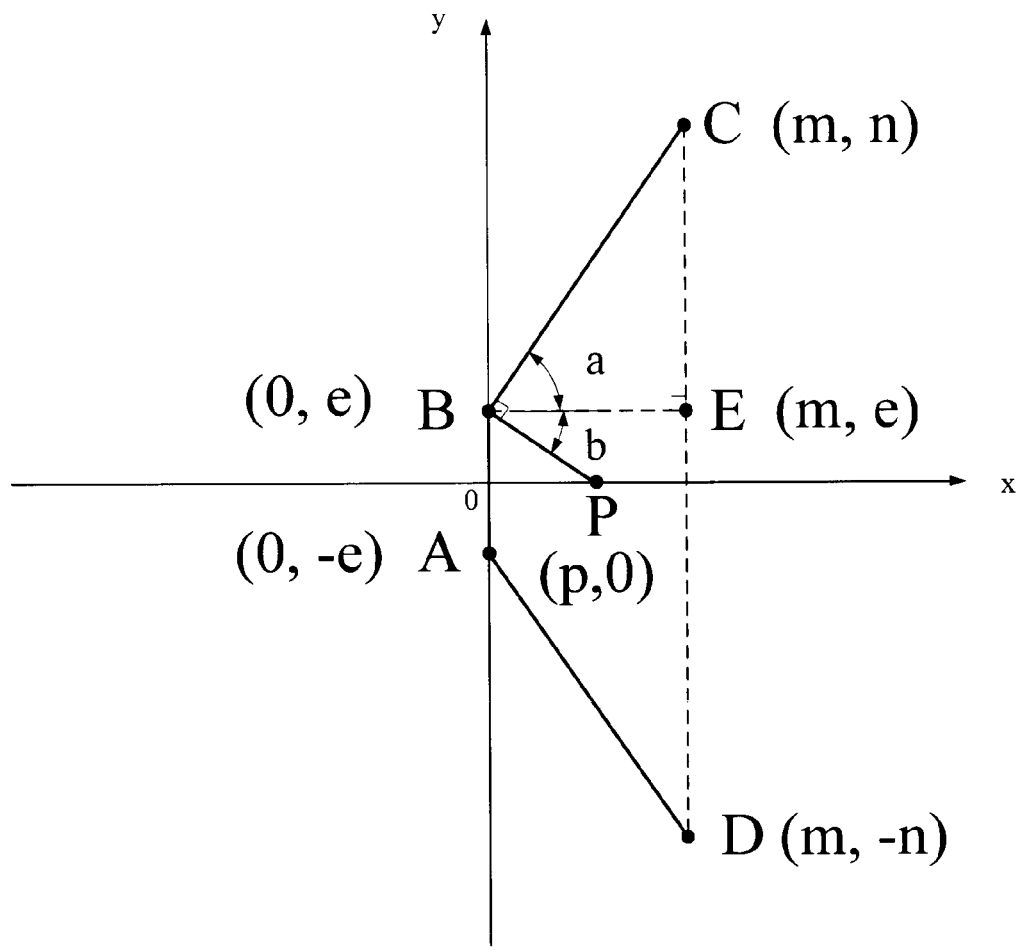
FIG. 2a shows a position of a first point in the Cartesian diagram of FIG. 1.

The first critical point is shown in an embodiment of FIG. 2a. The first critical point satisfies that a plus "b" is 90(a+b=90). And triangle CBE is similar to triangle PBO(△CBE ∽ △PBO). Therefore it can be understood that the proportion between OB and BE is equal to the proportion between OP and EC(OB/BE=OP/EC), i.e.

$$\frac{e}{m} = \frac{p}{n-e}$$

so that an equation as follows can be obtained.

$$e = \frac{n - \sqrt{n^2 - 4pm}}{2}$$

Another equation as follows can be obtained after recursing the equation:

$$\tan(a) = \frac{2p}{n - \sqrt{n^2 - 4pm}} \quad 1)$$

Figure 2B:
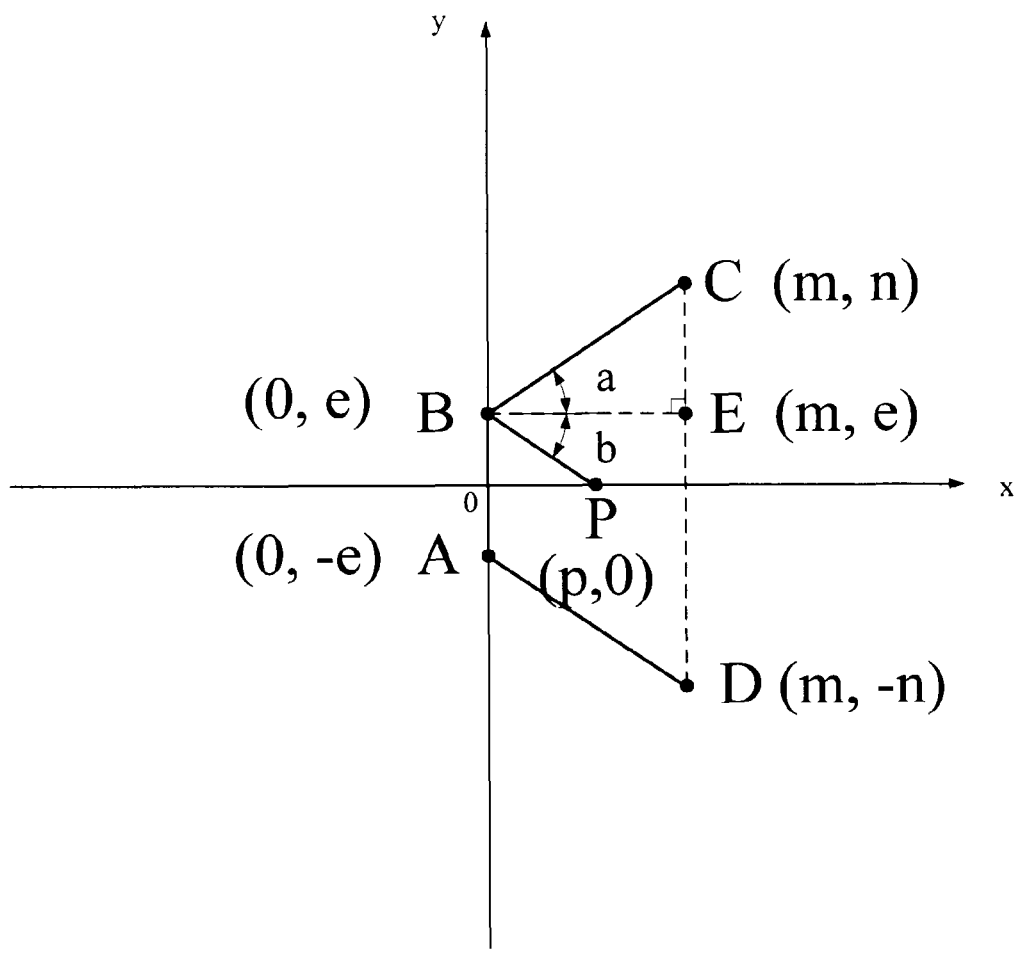
FIG. 2b shows a position of a second point in the Cartesian diagram of FIG. 1.

The second critical point is shown in an embodiment of FIG. 2b. The second critical point satisfies that "a" is equal to b(a=b). Triangle CBE is similar to triangle BPO(△CBE ∽ △BPO). Therefore, those of ordinary skill in the art would appreciate that the proportion between OB and EC is equal to the proportion between OP and BE(OB/EC=OP/BE), where $$\frac{e}{n-e} = \frac{p}{m}$$

so that an equation as follows can be obtained.

$$e = \frac{pn}{m+p}$$

Another equation as follows can be obtained after recursing the equation:

$$\tan(a) = \frac{n}{m+p} \quad 2)$$

After merging equation (1) and equation (2), an inequality (3) showing the value range of a as follows can be obtained.

$$\frac{n}{m+p} < \tan(a) < \frac{2p}{n - \sqrt{n^2 - 4pm}} \quad 3)$$

Based on above arrangement, the brightness of the horizontal laser light emitted by the laser line projector is even.

Figure 3:
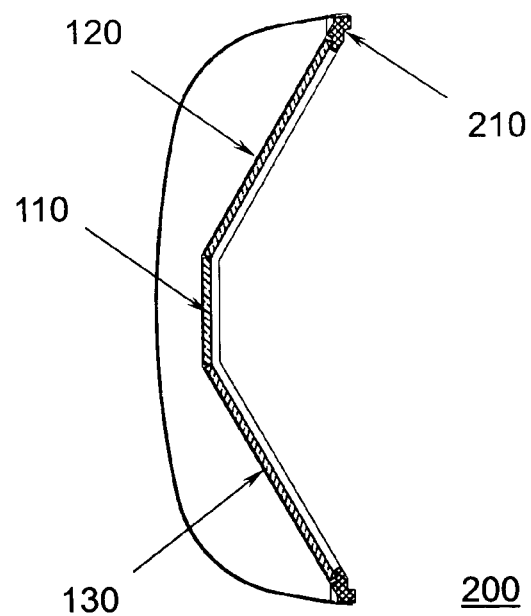
FIG. 3 shows a plan view of a window assembly.

In an embodiment shown in FIG. 3, a window assembly 200 includes a window frame 210 and a window module mounted in the window frame 210. The window module includes a front window 110, a left window 120, and a right window 130.

Figure 4:
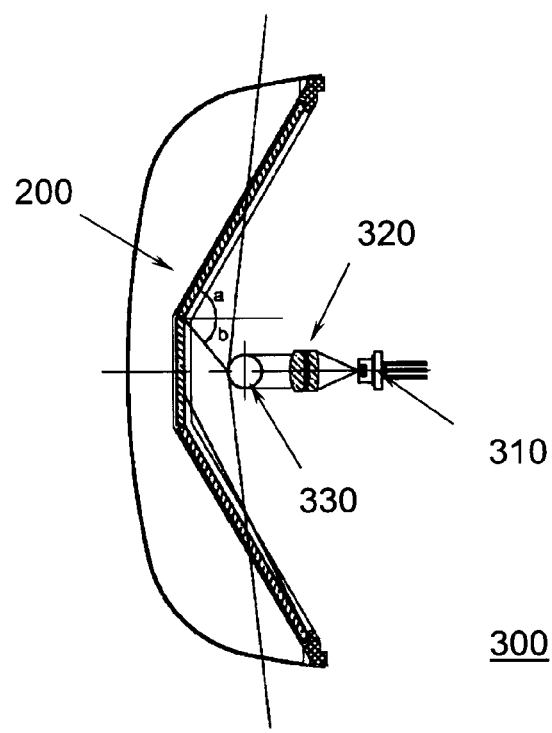
FIG. 4 shows a plan view of a laser line projector.

In an embodiment shown in FIG. 4, a laser line projector 300 includes a housing (not shown) and a hanging system. The hanging system has a laser 310, a collimation apparatus 320, and a lens 330 with a high refractive index. In an embodiment, the lens 330 is cylindrical.

The window assembly 200, as shown in FIG. 3, is positioned in the housing. A laser light emitted by the laser 310 enters the lens 330 after being collimated by the collimation apparatus 320, and is diverged by the lens 330 to form a laser light having a diffusion angle of approximately 180° or more. The laser light is diverged outwardly through the window assembly 200.

In an embodiment (not shown), the hanging system has a second laser module. The two laser modules are positioned on the same horizontal level and arranged relative to each other. The laser lights emitted by the two laser modules intersect to form a laser light with 360° diffusion angle.

Those of ordinary skill in the art would appreciate that the above embodiments are intended to be exemplary, and not restrictive. For example, modifications may be made to the above embodiments by those skilled in this art, and various features described in different embodiments may be freely combined with each other without conflicting in configuration or principle.

Although several exemplary embodiments have been shown and described, it would be appreciated by those skilled in the art that various changes or modifications may be made in these embodiments without departing from the principles and spirit of the disclosure, the scope of which is defined in the claims and their equivalents.

What is claimed is:

1. A window assembly for a laser line projector, comprising:
   a front window, a left window, and a right window positioned on the same plane, a projection of the front window, left window and right window having a shape of an isosceles trapezoid, the projection of the front window being an upper base of the isosceles trapezoid, and projections of the left window and right window being opposite legs of the isosceles trapezoid, the isosceles trapezoid having:
   the projection of the front window on the plane being line segment AB, the projection of the left window on the plane being line segment BC, and the projection of the right window on the plane being line segment AD,
   a Cartesian coordinate system having:
   a midpoint of line segment AB being the origin of the Cartesian coordinate system,
   a direction of line segment OB extending in a positive direction of the Y-axis,
   a direction that a perpendicular bisector of line segment AB extending towards C point or D point forms in a positive direction of the X-axis, such that:
   the coordinates of C point are (m, n),
   the coordinates of D point are (m, −n),
   E point is the projection of B point on the line segment CD whose coordinates are (m, e),
   the coordinates of B point are (0, e),
   the coordinates of A point are (0, −e),
   P point is the light source point whose coordinates are (p, 0), and
   wherein m, n, e, p satisfy the conditions as follows:

$m>0, n>0, e>0, p>0$, and $0<p<m$, the Cartesian coordinate system including ∠CBE is a and ∠PBE is b, which both are acute angles, wherein a and b satisfy the conditions as follows:

$a>b$ and $a+b>90°$, and $$\frac{n}{m+p} < \tan(a) < \frac{2p}{n - \sqrt{n^2 - 4pm}}.$$

2. A laser line projector, comprising:
   a housing having a window assembly with:
   a front window, a left window, and a right window positioned on the same plane, a projection of the front window, left window and right window having a shape of an isosceles trapezoid, the projection of the front window being an upper base of the isosceles trapezoid, and projections of the left window and right window being opposite legs of the isosceles trapezoid, the isosceles trapezoid having:
the projection of the front window on the plane being line segment AB, the projection of the left window on the plane being line segment BC, and the projection of the right window on the plane being line segment AD,
a Cartesian coordinate system having:
a midpoint of line segment AB as the origin of the Cartesian coordinate system,
a direction of line segment OB extending in a positive direction of the Y-axis,
a direction that a perpendicular bisector of line segment AB extending towards C point or D point forms in a positive direction of the X-axis, such that:
the coordinates of C point are (m, n),
the coordinates of D point are (m, −n),
E point is the projection of B point on the line segment CD whose coordinates are (m, e),
the coordinates of B point are (0, e),
the coordinates of A point are (0, −e),
P point is the light source point whose coordinates are (p, 0), and
wherein m, n, e, p satisfy the conditions as follows:

$m>0, n>0, e>0, p>0$, and $0<p<m$, the Cartesian coordinate system including ∠CBE is a and ∠PBE is b, which both are acute angles, wherein a and b satisfy the conditions as follows:

$a>b$ and $a+b>90°$, and $$\frac{n}{m+p} < \tan(a) < \frac{2p}{n - \sqrt{n^2 - 4pm}};$$

and
a hanging system having a laser module.

3. The laser line projector of claim 2, wherein the laser module which comprises a laser, a collimation apparatus, and a lens with a high refractive index.

4. The laser line projector of claim 3, wherein the lens is cylindrical.

5. The laser line projector of claim 4, wherein a laser light emitted by the laser has a laser light path extending from the laser, through the collimation apparatus, into the lens, and into the window.

6. The laser line projector of claim 5, wherein the laser light path diverges from the lens with a diffusion angle that is 180° or more.

7. The laser line projector of claim 6, wherein the laser light path is diverged outwardly through the window.

8. The laser line projector of claim 7, wherein the hanging system includes a second laser module substantially similar to the laser module.

9. The laser line projector of claim 8, wherein the two laser modules are positioned in a same plane.

10. The laser line projector of claim 8, wherein the laser light paths of the two laser modules intersect such that the laser lights of the two laser modules intersect to form a laser light with a 360° diffusion angle.

* * * * *